A. M. CARLSEN.
NUTCRACKER.
APPLICATION FILED SEPT. 1, 1911.

1,030,805.

Patented June 25, 1912.

WITNESSES:
M. M. Carlsen
A. E. Carlsen

INVENTOR:
A. M. Carlsen.

UNITED STATES PATENT OFFICE.

ANDREW M. CARLSEN, OF ST. PAUL, MINNESOTA, ASSIGNOR TO FRANK H. HEINEN, OF SHAKOPEE, MINNESOTA.

NUTCRACKER.

1,030,805.  Specification of Letters Patent.  Patented June 25, 1912.

Application filed September 1, 1911. Serial No. 647,173.

*To all whom it may concern:*

Be it known that I, ANDREW M. CARLSEN, a citizen of the United States, residing at St. Paul, in the county of Ramsey and State of Minnesota, have invented a new and useful Nutcracker, of which the following is a specification.

My invention relates to nut-crackers, and the main object is to provide a nut-cracker with an operating mechanism of such construction that the cracking force and the stroke of the operating lever may be readily changed before and during the operation of the device. Another object is to provide a nut cracker resembling an animal whose tail swings at the natural point where a tail usually swings and to use said tail as the operating lever of the cracker.

These and other objects I attain by the novel construction and combination of parts illustrated in the accompanying drawing, in which,—

Figure 1:
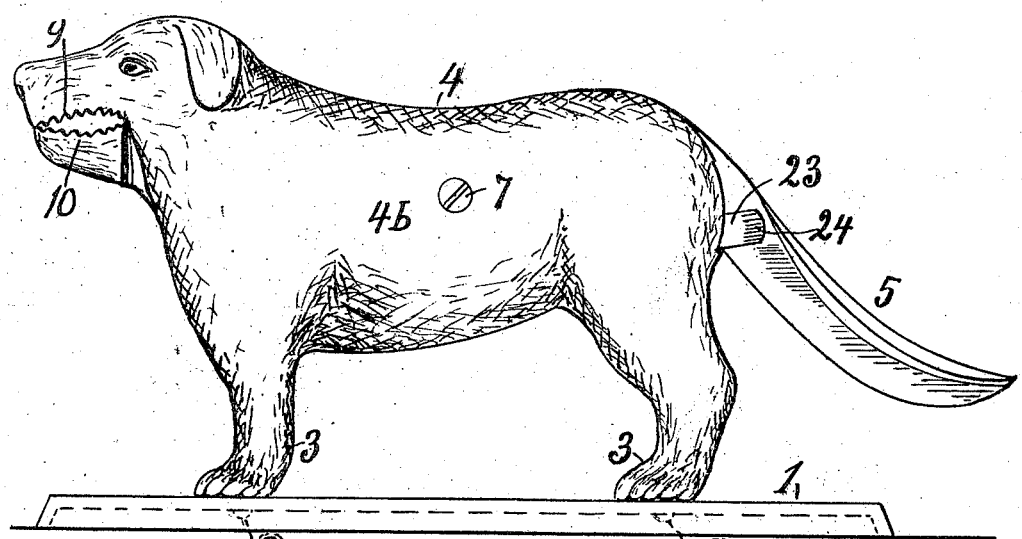
Figure 2:
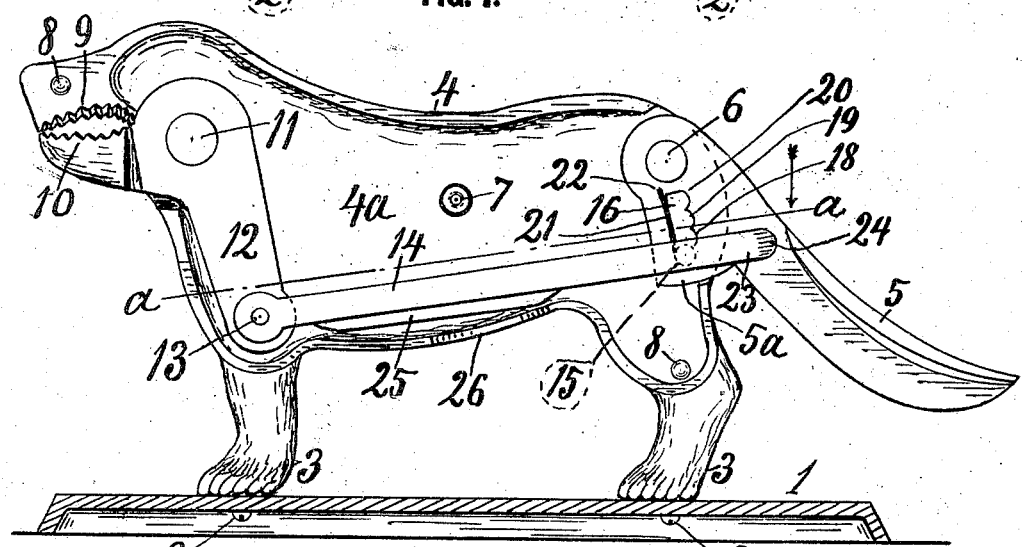
Figure 3:
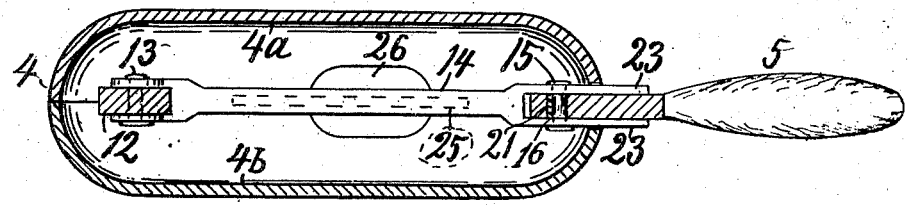

Figure 1 is a side elevation of my improved nut-cracker. Fig. 2 is an inside side elevation of the right one half of the animal body shown in Fig. 1, and the operating and operated parts mounted therein. Fig. 3 is a section of the device as on the line $a$—$a$ Fig. 2.

Referring to the drawing by reference numerals, 1 designates a flat base hollow at the bottom side and adapted to be placed upon a table or chair when the device is to be used. Secured upon said base by screws 2 are the legs 3 of an animal 4, which is preferably formed of cast iron or other metal and has a tail 5 pivotally mounted at 6 to swing in a vertical plane in the rear end of the body of the animal so as to resemble a natural tail in such motion. The animal may preferably resemble a dog or a lion. The hollow body of the animal is preferably cast in a right and a left half $4^a$ and $4^b$ respectively, which are secured together by a screw 7, and are prevented from turning on the screw by dowel studs 8 cast on one half and entering into cavities (not shown) in the other half. The upper jaw or roof of the mouth of the animal is rigid with the head and is curved and concaved and formed with corrugations 9, as best shown in Fig. 2. The lower jaw 10 is also provided with corrugations or waves as shown. The lower jaw is pivoted at 11 and formed with a downward lever 12, to whose lower end is pivoted at 13 the front end of a rod 14, whose rear end is pivoted to the combined tail and lever 5. The latter pivotal connection is of a peculiar form, in that the rod carries a pivot pin 15, which engages in a normally about vertical slot 16 in a flat portion $5^a$ of the lever. The rear side of the slot is formed with several notches 18, 19 and 20, and in the front side of the slot is a leaf spring 21, having one end secured in a notch at 22. The function of said spring is to hold the pin 15 rearward and thereby engaged in either of the notches 18, 19, 20. The rear end of the rod may be forked and have one or two thin extensions 23 projected rearwardly beyond the body of the animal close by the side or sides of the tail. Said extension may have corrugations 24 or other means for the finger of the operator to engage in moving the rear end of the rod with its pivot 15 upward and downward in the slot 16, so as to thereby increase or decrease the force at the jaws as may be required for the different kinds of nuts operated on, 25 is a down-ward projection or rib on the rod 14, and 26 is an aperture in the belly of the animal for reaching said rod or its rib with a finger. When said aperture and rib are used the spring 21 and the extensions 23 may be omitted, and vice versa, when the spring and extensions or one extension 23 are used the aperture 26 may be dispensed with, but nevertheless it is evidently an advantage to have all of said means in the same device, since one operator may prefer to use the one and another operator the other, and any operator will make use of either if the other gets out of order.

In the operation of the device it is already fairly well indicated that the nuts are placed one by one between the jaws 9, 10 while the lever 5 is raised sufficiently to admit the nut between the jaws, the lever is then swung downward with the result that the nut is cracked; in such operation the lever or tail may not have to be raised higher than to a horizontal position as long as ordinary nuts are operated on, but if the nuts are extra hard, the rod 14 is lifted with its pin 15 into the upper part of the slot 16, as high as may be required, either by pressing upward on the corrugations 24 by a thumb or finger of the hand holding the lever, or by pushing upward with a finger of the other hand through the aperture 26. This raising of the rod 14 does not change the opening between the jaws, which opening is always large enough for all nuts to be cracked, but it enables the lever 5 to be swung almost to vertical position upward, thereby doubling its stroke downward and thus doubling or greatly increasing the closing force at the jaws, as will readily be understood by all who know the laws of leverage. When the hard nut or nuts are cracked a light downward pressure at the corrugations 24 will bring the rod 14 down to its normal position, or if the spring 21 is omitted the rod will by its own weight drop to normal position as soon as released from the operator's finger, which may support it during operation for a short period; but where many hard nuts are to be cracked a device having the spring 21 will be preferable.

What I claim is:—

1. A nut-cracker comprising a hollow frame resembling the body of an animal, the same having in each end an opening and adjacent the front opening a stationary upper jaw, a movable lower jaw pivotally mounted in the front end of the body and having an integrally formed lever hanging downward from it within the body; an operating lever pivotally mounted in the rear end of the body to resemble a tail to the animal, and having a pivot hole, a connecting rod having in one end a pivot engaging in said pivot hole and its other end pivoted to the lower end of the lever of the movable jaw; said pivot hole in the operating lever being slotted vertically, and means arranged to be reached by a finger for raising the connecting rod with its pivot to any desired point in said slotted hole.

2. A nut-cracker comprising a hollow frame resembling the body of an animal, the same having in each end an opening and adjacent the front opening a stationary upper jaw, a movable lower jaw pivotally mounted in the front end of the body and having an integrally formed lever hanging downward from it within the body; an operating lever pivotally mounted in the rear end of the body to resemble a tail to the animal and having a pivot hole, a connecting rod having in one end a pivot engaging in said pivot hole and its other end pivoted to the lower end of the lever of the movable jaw, said pivot hole in the operating lever being slotted vertically and in the rear side provided with one or more notches, and means for reaching the connecting rod and raising it with the pivot into engaging position with said notch or notches.

3. A nut-cracker comprising a hollow frame resembling the body of an animal, the same having in each end an opening and adjacent the front opening a stationary upper jaw, a movable lower jaw pivotally mounted in the front end of the body and having an integrally formed lever hanging downward from it within the body; an operating lever pivotally mounted in the rear end of the body to resemble a tail to the animal and having a pivot hole, a connecting rod having in one end a pivot engaging in said pivot hole and its other end pivoted to the lower end of the lever of the movable jaw, said pivot hole in the operating lever being slotted vertically and in the rear side provided with one or more notches and means for reaching the connecting rod and raising it with the pivot into engaging position with said notch or notches, and a spring arranged to press the pivot into the notch or notches to support the rod in raised position.

In testimony whereof I affix my signature, in presence of two witnesses.

ANDREW M. CARLSEN.

Witnesses:
M. M. CARLSEN,
A. E. CARLSEN.